J. R. SNYDER.
REBOUND CHECK.
APPLICATION FILED JAN. 18, 1918.
1,286,818.
Patented Dec. 3, 1918.
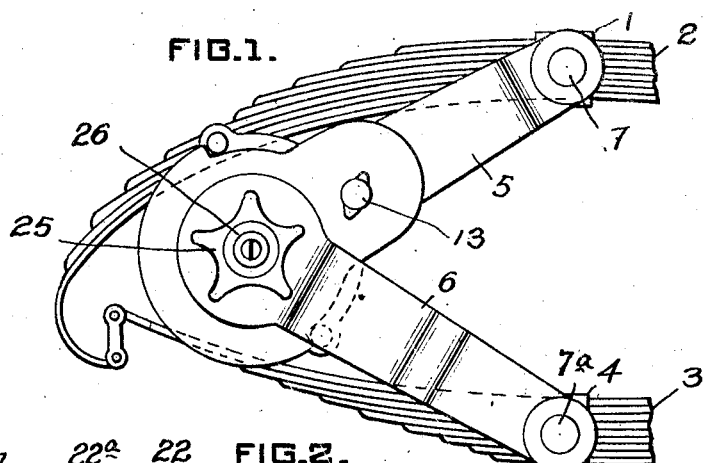
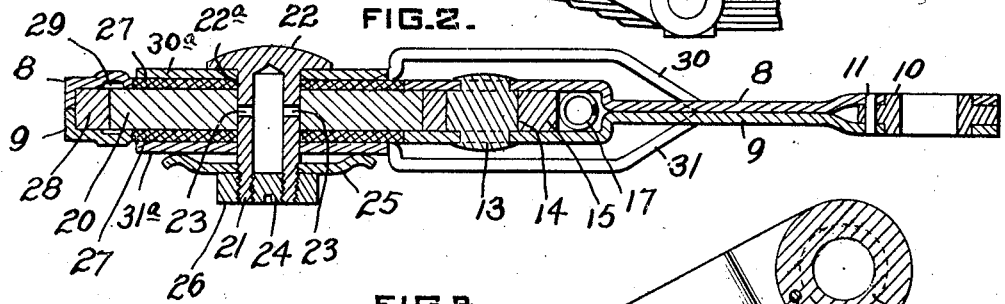
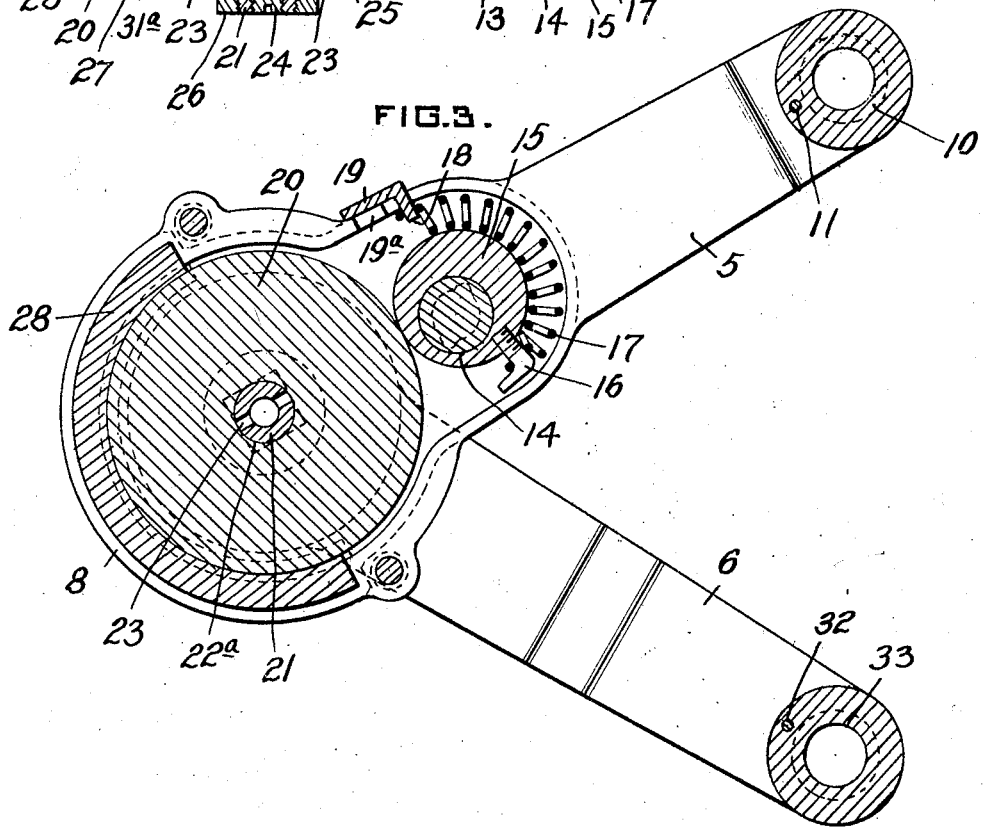
WITNESSES
J. Herbert Bradley.
Jo. Baily Brown.
INVENTOR
Jacob Rush Snyder
by Fredk W. Winter
his Attorney

UNITED STATES PATENT OFFICE.

JACOB RUSH SNYDER, OF PITTSBURGH, PENNSYLVANIA.

REBOUND-CHECK.

1,286,818.  Specification of Letters Patent.  Patented Dec. 3, 1918.

Application filed January 18, 1918. Serial No. 212,526.

*To all whom it may concern:*

Be it known that I, JACOB RUSH SNYDER, a resident of Pittsburgh, in the county of Allegheny and State of Pennsylvania, have invented a new and useful Improvement in Rebound-Checks, of which the following is a specification.

This invention relates to rebound checks adapted to be arranged between any two parts subject to movement in respect to each other. More particularly, it is adapted for use with automobiles and similar vehicles, for the purpose of restraining the rebound resulting from sudden compression of springs connecting the vehicle body and its running gear.

The objects of the invention are to provide a device of the class described in a simplified form, comprising friction elements adapted to be actuated in one direction of movement, and to be free in the other direction.

Referring to the drawings, Figure 1 is a side elevation showing the device in operative position applied to the springs of an automobile; Fig. 2 is a horizontal section through the device in the position shown in Fig. 1; and Fig. 3 is a vertical section of the device in the position shown in Fig. 1.

As shown in the accompanying drawings, the rebound check is applied to an automobile in which 1 is a clip rigidly attached to a part of the vehicle body, such as the upper member 2 of a spring, and 4 is a clip rigidly attached to a portion of the vehicle running gear such as the lower member 3 of a spring. These parts may be of any desired design or construction, and the attachment of the rebound check thereto is indicated diagrammatically.

The device of this invention comprises two main parts, the upper one of which is designated as an entirety by the numeral 5, and the lower as an entirety by the numeral 6. These parts are substantially levers, having their free ends pivotally connected by bolts 7 and 7ª, or any other suitable connections, to the two parts of the vehicle as above stated.

The upper part 5 is formed from two metal plates, or stampings, 8 and 9 between which, at the free end, is carried a bearing member 10, adapted to engage the fixed pivot 7 on the vehicle body. A pin 11 holds the plates 8 and 9 and the bearing 10 in fixed relative positions, as shown in Fig. 2.

The other ends of the plates 8 and 9 are enlarged, and shaped to form a housing adapted to contain certain moving parts below described, and to be packed with grease. A bearing member 13, extends through the plates 8 and 9. The inner portion of this member is enlarged, to form a bearing 14 for an eccentric or cam locking member 15 rotatably mounted thereon, as shown in Fig. 3. The bearing member 13 is rigidly attached to the plates 8 and 9 by means of the shoulder formed by the enlarged bearing portion 14, and riveted heads outside the plates, as shown in Fig. 2. A coiled tension spring 17 has one end attached to a hook 16 fastened in the locking member 15 and the other end attached to an extension 18, of a flap member 19, pivotally mounted in the edge of the housing. The flap covers a grease port 19ª. This spring tends to constantly rotate the cam member 15 in a counter-clockwise direction.

A circular disk 20 is also carried in the housing, mounted on a bolt 21, which has an enlarged head 22 on one side of the housing, with a square portion 22ª just beneath the head, engaging the housing wall, so as to prevent rotation of the bolt. The bolt is hollow, and near its middle portion has transverse ducts 23, and a screw plug 24 in the open end thereof. This permits the bolt to be filled with grease, to secure lubrication of the disk 20, which rotates thereabout. A resilient spring washer 25 is placed beneath the terminal nut 26, of the bolt 21. The plates 8 and 9 are cut away to form circular openings through the housing somewhat smaller than the disk 20. Concentric friction members 27 bear against the sides of disk 20, and are situated in the openings just referred to, in the walls of the housing. The disk 20 is loosely mounted on the bolt 21, which does not form its bearing. A semicircular member 28 is carried rigidly in the housing and forms the operative bearing for disk 20. It will be observed that this semi- or half-bearing is so placed in the housing that it takes all strain from the center bolt 21. Also this construction permits a thorough lubrication of all wearing surfaces by means of grease with which the housing is packed through port 19ª. This prevents wear and avoids all squeaks or rattles that occur as a result of dry bearings. This also insures exceptionally long life for the device without renewal of the bearings. The plates 8 and 9 are pressed to form a channel 29, extending around the inner edge of the bearing 28, to permit the grease to work into and out of the bearing.

The other lever member 6 is also composed of two plates 30 and 31, pinned together at their outer ends by a rivet 32 and carrying at that end a bearing member 33, similar to the member 10, above described. At their inner ends the plates 30 and 31 are spread apart and enlarged into flat circular portions 30ª and 31ª, respectively, adapted to coöperate with the friction members 27, clamped between the plates and the rotatable disk 20, by the bolt 21 and washer 25, as shown in Fig. 2. The resilient washer 25 bears against one of the plates and the head 22 against the other, forming a resilient clamp to engage the plates 30 and 31 with the friction members 27, and permitting any desired amount of pressure therebetween.

The operation of the device is as follows:

The bearings 10 and 33 being attached to fixed pivots on the body and running gear of a vehicle, the nut 26 is adjusted to any desired point, according to the amount of friction desired for the purpose of retarding the rebound of the vehicle body. The spring 17 tends to constantly force the eccentric 15 into engagement with the circular member 20, consequently all wear of disk 20 and bearing 28 will be automatically compensated by the further turning of cam member 15. It will be observed that this eccentric is so situated that if rotated clockwise, it tends to pass out of engagement with the circular member 20, and when rotated counter-clockwise it forms a locking engagement therewith. Consequently when the free ends of the members 5 and 6 are brought together, the eccentric member 15 will tend to move clockwise and so will slip freely on the member 20. In this case the lever member 5 turns freely about the disk 20 as an axis, the friction members 27, friction plates 30ª and 31ª, disk 20 and bolt 22 having no relative movement. When, however, the lever members are spread apart, the eccentric 15 will tend to rotate counter-clockwise, and will therefore immediately form a locking engagement with the circular member 20, having the effect of locking the lever member 5, eccentric 15, disk 20, and bearing 28 into a rigid integral lever. The friction members 27 must therefore move with relation to the plates 30ª and 31ª, or on the disk 20, or both. This relative movement of the friction members and their clamping members furnishes the retarding action upon rebound of the vehicle.

The many advantages of this invention, in the nature of simplicity of parts, economy of construction, strength and automatic taking up of wear of the parts, will be apparent to those familiar with the art.

I claim:

1. A rebound check comprising two connected lever arms adapted to be attached at their free ends to the body and running gear respectively of a vehicle, the connection between the lever arms comprising a circular friction member having a frictional engagement with one of the lever arms and forming a pivotal bearing for the other lever arm, and a locking member pivotally mounted on the other lever arm and having an eccentric locking face extending over an arc of substantially 180° and constantly in engagement with and adapted to lock the friction member to itself and rotate it against friction with respect to the first lever member, when the free ends of the lever arms are moved apart.

2. A rebound check comprising lever arms connected to each other, said connection comprising a rotatable disk frictionally clamped to the end of the first lever arm and forming a circular bearing upon which the second lever arm is freely rotatable in one direction of movement, and a locking member pivotally mounted on the other lever arm and having an eccentric locking face extending over an arc of substantially 180° and constantly in engagement with and adapted to lock the disk to the second lever arm and rotate it with respect to the first lever arm in the other direction of movement.

3. In a rebound check comprising two connected lever arms, a circular disk frictionally clamped to the first lever arm, a semi-circular bearing carried by the second lever arm mounted on the periphery of the disk, an eccentrically mounted circular member carried by the second lever arm and constantly engaging the periphery of the disk, whereby to permit unrestricted bringing together of the free ends of the lever arms but to lock the disk to the second lever arm and drive it against friction with the first lever arm upon the spreading apart of the free ends of the lever arms.

4. A rebound check comprising a lever member arranged to be attached to a vehicle body and having two oppositely disposed friction surfaces, a rotatable disk clamped between the friction surfaces of the said lever member, a second lever member pivotally connected to the first lever member by a bearing engaging the periphery of the disk and arranged to be attached at its free end to the vehicle running gear, the other end forming a housing inclosing the friction disk, and a locking member pivotally mounted in the housing formed in the second lever member and having an eccentric locking face extending over an arc of substantially 180° arranged to engage and lock the disk when the lever arms are spread apart so as to cause the disk to rotate relative to the friction surfaces of the first lever member.

5. A rebound check comprising a lever member arranged to be attached at its free end to a vehicle frame and having two oppositely disposed friction surfaces, a second lever member connected to the first lever member and arranged to be attached to the vehicle running gear at the other end, a circular rotatable member carried in a housing at the connected ends of the lever members, concentric friction lining members on each side of the circular rotatable member the friction faces of the first lever member clamping the friction linings against the rotatable member, and a locking member pivotally mounted on the other lever member and having an eccentric locking face extending over an arc of substantially 180° and constantly in engagement with and adapted to engage and lock the rotatable member with respect to the second lever member when the free ends of the levers are spread apart.

6. A rebound check comprising two lever members pivotally connected, a rotatable friction member carried in a housing formed by one of the lever members, friction faces carried by the other lever member and adapted to coöperate with the rotatable friction member, an eccentric disk rotatably mounted in the housing and adapted to lock and drive the rotatable friction member when the free ends of the lever members are moved apart and to disengage when the free ends are moved together.

7. A rebound check comprising two lever members pivotally connected at one end, a rotatable friction member carried in a housing formed by one of the lever members, friction faces carried by the other lever member and coöperating with the rotatable friction member, a semi-circular bearing for said rotatable friction member and engaged by the periphery of the latter, an eccentric locking member pivotally mounted in the housing and spring-biased to constantly engage said rotatable friction member and lock the latter when the free ends of the lever members are moved apart and release said rotatable friction member when the free ends of the lever members are moved together.

In testimony whereof, I have hereunto set my hand.

JACOB RUSH SNYDER.

Witness:
GLENN H. LERESCHE.